May 18, 1937.   F. W. ELLS   2,080,465
PRESSURE CONTROLLING MECHANISM
Filed Dec. 9, 1935   4 Sheets-Sheet 1

INVENTOR
Frederick W. Ells
BY
Wheeler, Wheeler & Wheeler
ATTORNEYS

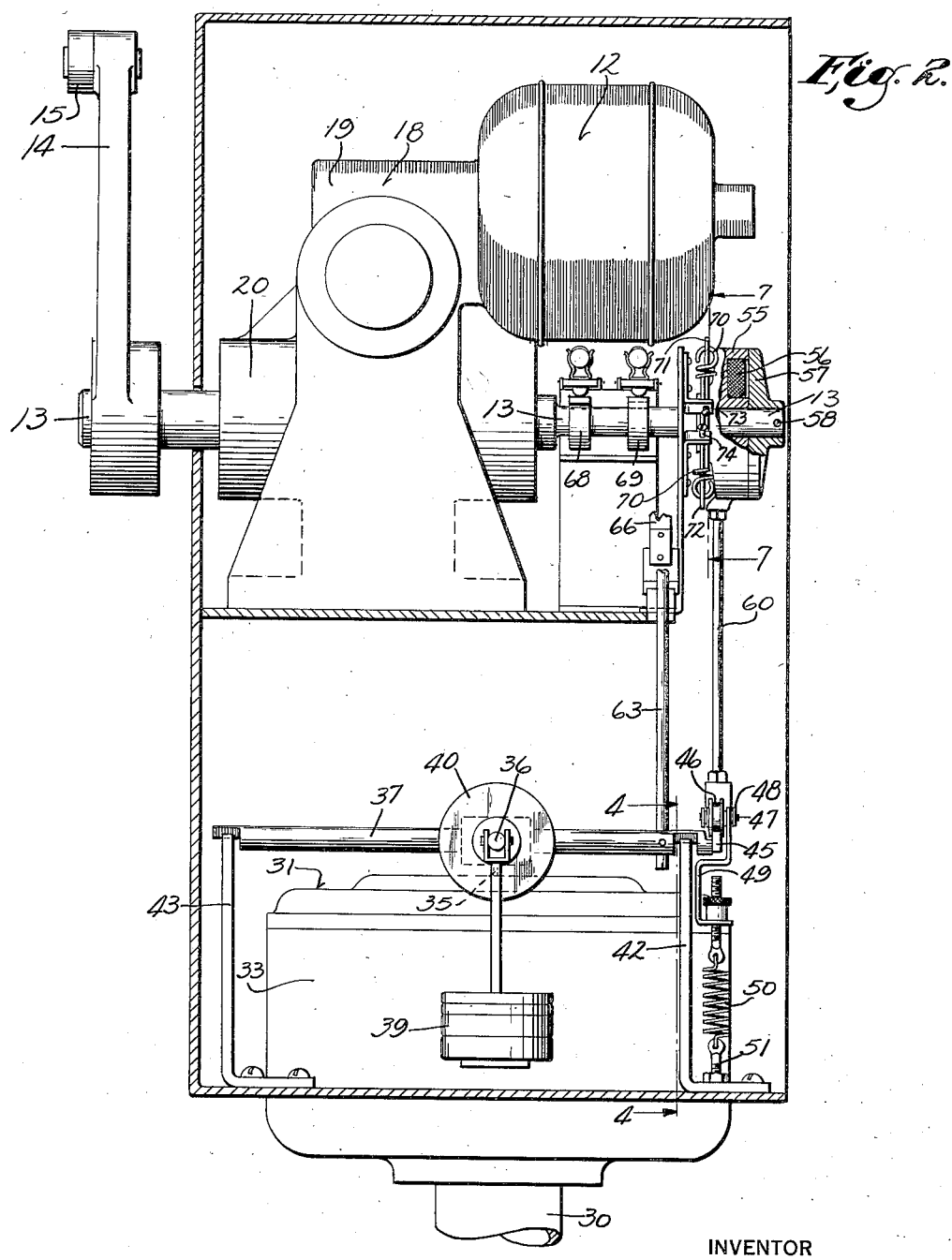

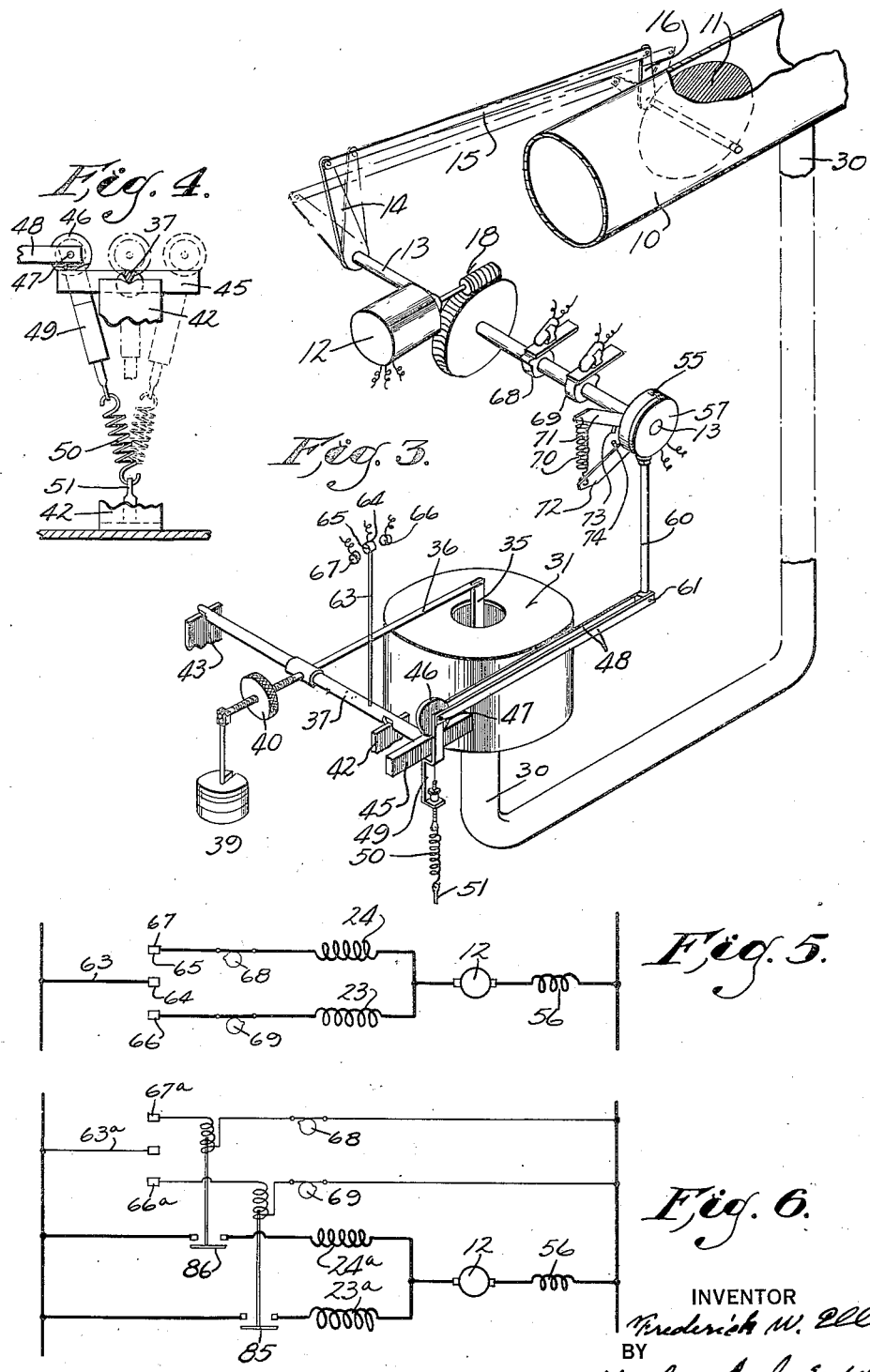

May 18, 1937.  F. W. ELLS  2,080,465
PRESSURE CONTROLLING MECHANISM
Filed Dec. 9, 1935   4 Sheets-Sheet 4

INVENTOR
Frederick W. Ells
BY
Wheeler Wheeler & Wheeler
ATTORNEYS

Patented May 18, 1937

2,080,465

UNITED STATES PATENT OFFICE 2,080,465

PRESSURE CONTROLLING MECHANISM

Frederick W. Ells, Milwaukee, Wis.

Application December 9, 1935, Serial No. 53,599

13 Claims. (Cl. 50—10)

My invention relates to improvements in pressure controlling mechanism for gas mains and analogous purposes and has particular reference to the control of power driven valve adjusting mechanisms for the service mains of gas supply systems of the general type shown in my former Patent Number 1,172,774, dated February 27, 1916.

As heretofore constructed, these valve adjusting mechanisms have been subject to so-called "hunting effects" due to the time lag between a correct positioning of the valve and a development of the desired predetermined pressure in the main. Reversible motors responsive to pressure within the main are ordinarily employed to operate the valve adjusting mechanism and as they continue in operation until they are stopped by restoration of the desired or predetermined pressure in the main, they actuate the valve beyond its proper position of adjustment with an ultimate variation in pressure within the main which requires a reversal of the motor and a readjustment of the valve in an opposite direction. In mains which are subject to considerable variation in the rate of consumption at more or less distant points these hunting operations may become fairly continuous and the difficulty of maintaining a substantially constant pressure in the main presents a serious problem.

Attempts have been made to solve the above mentioned problem by reducing the range of the hunting operations with the aid of auxiliary means for reversing the valve adjusting motor at short intervals independently of pressure conditions in the main. But such methods are objectionable for the reason that each reversal results in a brief adjustment of the valve in the wrong direction and this objectionably delays the restoration of normal conditions in the main.

The object of my invention is to provide means whereby a valve adjusting motor may be operated in such a manner as to correctly position a valve within a gas main to compensate for variations in the rate of withdrawal without developing hunting operations and without objectionable delay due to reversals in the operation of the motor or in the movement of the valve.

More specifically, my object is to provide means whereby a valve may be adjusted step by step and the effectiveness of the adjustment tested after each step before continuing the adjustment, whereby excessive valve movement is avoided and hunting effects are eliminated.

A further object is to provide valve adjusting and associated pressure testing mechanism which will be responsive to extremely slight variations in pressure and effective to increase or reduce deliveries from a source of supply substantially in precise accordance with variations in consumption.

In the drawings:

Figure 2 is a side elevation.

Figure 3 is a conventional illustration of the relation of the major features of the apparatus to each other.

Figure 4 is a detail view, partly in section, drawn to line 4—4 of Figure 2.

Figure 5 is an electrical diagram.

Figure 6 is an electrical diagram showing a slight modification.

Like parts are identified by the same reference characters throughout the several views.

Figure 1:
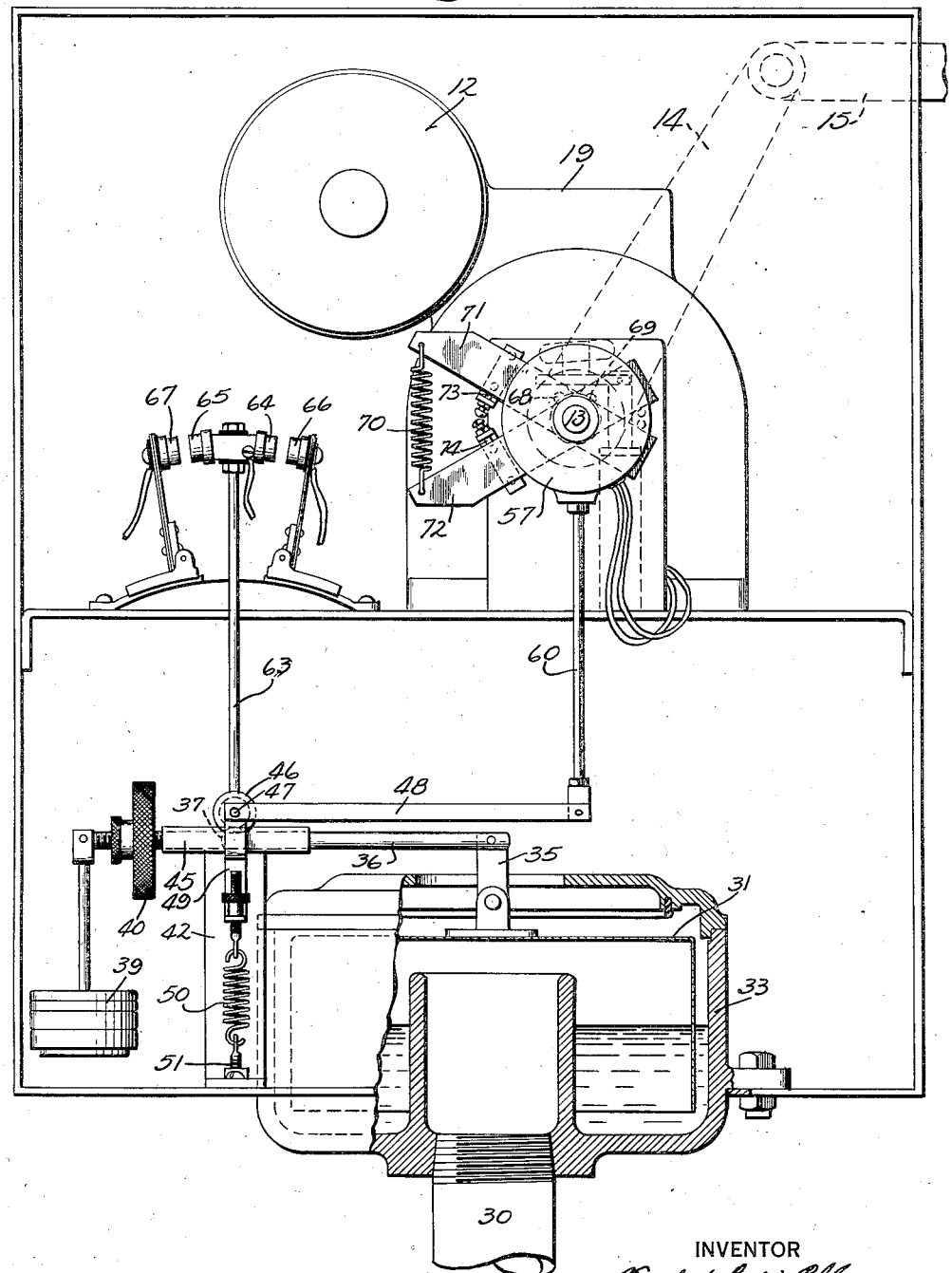
Figure 1 is a front elevation of my improved valve adjusting and pressure testing mechanism as used to control the pressure in a service main under varying rates of consumption.
Figure 7:
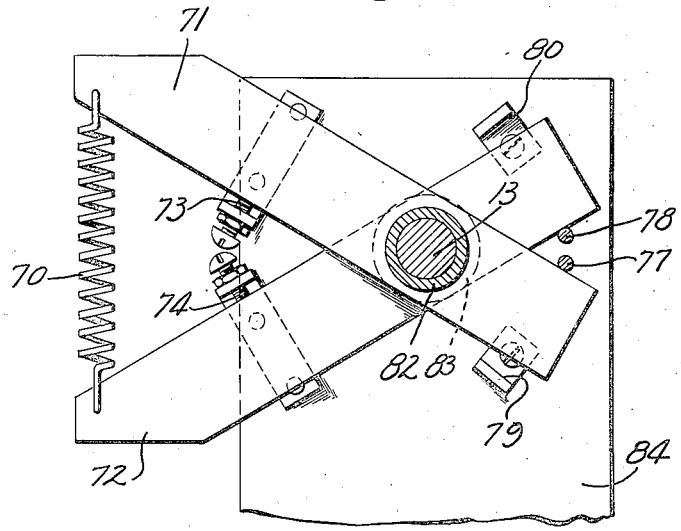
Figure 7 is a sectional view, enlarged, drawn to line 7—7 of Fig. 2.

As conventionally illustrated in Figure 3, the service main 10 has its receiving end portion provided with a valve 11 for regulating delivery from a source of supply into the main whereby the rate of such delivery may be varied in accordance with consumption at points on the delivery side of said valve more or less distant therefrom. A reversible electric motor indicated at 12 is employed to adjust the valve 11 by oscillating the shaft 13, the motion of which is transmitted to the valve 11 through the arm 14, link 15 and the valve actuating arm or lever 16.

Speed reduction gearing indicated at 18 will preferably be enclosed in a suitable gear box 19 and may be employed for transmitting motion from the motor shaft to the rock shaft 13. The bearings for the latter shaft may be mounted in a suitable housing indicated at 20. The motor 12 may be provided with oppositely wound field coils 23 and 24 as indicated in Figure 5. Any suitable reversible motor may be used and any suitable means may be employed for transmitting motion from the motor to the rock shaft 13. Therefore further detailed illustration or description of these features are deemed unnecessary.

In order that the motor may be made responsive to pressure within the main 10, the receiving end portion of the main at the delivery side of the valve is provided with a movable member which is responsive to pressure in this portion of the main. Preferably, this portion of the main is connected by a pipe 30 with an ordinary pressure responsive bell 31, the lower margins of which are sealed in a body of liquid contained in an annular chamber 33 whereby the bell is raised or lowered in accordance with the pressure of the fluid which it receives from the main 10 through the pipe or duct 30. At its center the top wall of the bell 31 is connected by link 35 with a lever 36, fulcrumed to the transverse oscillatory fulcrum bar 37. The weight of the bell is counterbalanced by counterweights 39 on the outer or short arm of the lever 36 and by feed nut or adjustable counterweight 40.

The fulcrum bar 37 is mounted upon the fixed supporting members 42 and 43 with which it is in knife-edge contact. At one end this fulcrum bar 37 is provided with a normally horizontal cross bar 45 along the upper surface of which a carriage 46 (preferably a single roller) is adapted to travel. The pin or axle 47 upon which this roller is journalled is connected near its respective ends with actuating link bars 48 and at one side it is provided with a hanger 49, the lower end of which is connected by a coil spring 50 with a fixed support at 51. The link bars 48 are operatively connected with the oscillatory shaft 13, preferably by means now to be described and clearly illustrated in Figure 2.

The shaft 13 is provided with a magnetic clutch, one member 55 of which is provided with a coil 56 connected in the motor circuit. A disc-shaped clutch member 57 is fixedly secured to the shaft 13 as indicated at 58. The inner side face of this disc is in close proximity to or substantially in contact with the side face of the clutch member 55, whereby when the clutch member 55 is energized by current passing through the coil 56, said clutch member 55 may be rotatively actuated by the disc 57 in correspondence with the oscillatory movement of shaft 13. This motion is transmitted to the roller 46 through an arm 60 pivoted at 61 to the roller actuated link bars 48.

When the bearing of roller 46 upon the cross head 45 is in the vertical plane which includes the knife bearings of the fulcrum bar 37, the weights 39 and 40 will balance the bell 31, assuming the bell 31 to be subject to the desired or predetermined pressure from the main 10. Under these conditions, a switch arm 63 carried by the fulcrum bar 37 will be in a neutral position with its contacts 64 and 65 midway between their associated contact terminals 66 and 67, respectively. Movement of the switch arm 63 to bring either of its contacts to its associated terminal contact will close one of the motor circuits as indicated in Figs. 3 and 5.

It will be obvious that an increase of pressure within the bell will elevate it from the normal position in which it is shown in Fig. 1 thereby tilting the fulcrum bar and bringing contact 65 to terminal 67. This will close the circuit of the motor whereby shaft 13 will be oscillated in a counterclockwise direction to progressively close the valve 11.

A reverse adjustment will occur when the pressure in the main falls below normal. Switch arm 63 is then moved to the right in Fig. 1 until contact 64 engages terminal 66 to close the other motor circuit.

In either case roller 46 will be shifted upon cross head 45 to apply counterpressure to lever 36 until the fulcrum bar and associated switch arm 63 return to normal circuit breaking position.

Figure 8:
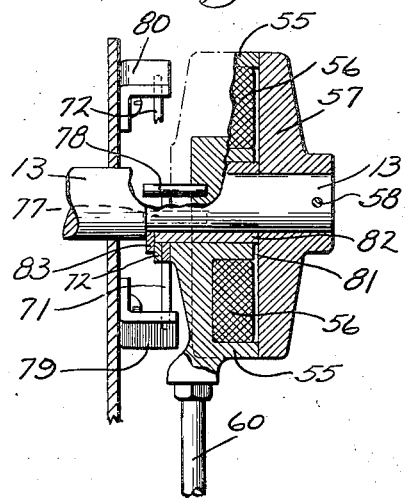
Figure 8 is a fragmentary sectional view of clutch member 55 and associated parts.

A pair of arms 71 and 72, pivotally mounted on shaft 13, are normally held by a tension spring 70 in contact with fixed stops 73 and 74. When clutch member 55 moves clockwise from normal Figure 1 position, a projection 77 thereon actuates arm 71. A reverse movement of the clutch member actuates arm 72 through projection 78. Therefore clutch member 55 is returned to normal position by the spring 70 when de-energized. Fixed limit stops at 79 and 80 establish predetermined limits for rotation of clutch member 55 by engagement with the moved arm 71 or 72 after which the actuating clutch member 57 will slip on member 55. A magnetic air gap is established at 81 (Fig. 8) in association with a brass bushing at 82 and a brass washer at 83 whereby the clutch de-energizes immediately when the circuit is broken.

The fixed stops 73 and 74 together with the limit stops 79 and 80 may be mounted upon a plate 84, connected with the frame.

When clutch member 55 returns to normal position, roller 46 will also be returned to its normal central position upon the cross head 45. If the pressure within the bell has been restored to normal, all parts will then remain at rest pending another variation in pressure within the main 10 between valve 11 and the outlets or points of consumption, but if the pressure within the bell has not been restored to normal, the return of roller 46 to its normal central position on the cross head will allow the bell to again actuate lever 36, whereupon the motor will again start in the same direction for a further adjustment of the valve 11.

The interval between these successive step by step operations of the motor for valve adjustment in one direction may be quite accurately timed by adjusting the tension of the spring 50 inasmuch as the roller 46 may be of light weight with little tendency to shift or tilt the fulcrum bar except under pressure applied by this spring. The diameter of the bell and consequent area exposed to the pressure of the gas will be such that any substantial variation of pressure within the belt will require to be overcome by a substantial pull in the opposite direction exerted by the spring 50. The latter will operate with increased mechanical advantage and also under increased tension as the roller moves along the cross head 45 from its normal position. And by adjusting the tension of the spring 50, each period or step of motor operation may be varied and the interval between such steps may also be timed in such a manner as to allow the effect of any given valve adjustment to bring the pressure in the main back to normal if the valve adjustment is sufficient. If insufficient, another step in the adjusting movement will immediately follow.

My improved valve adjusting means has a further advantage over those heretofore used in that such step in valve adjustment is made proportionate in length to the degree or violence of the fluctuation of pressure within the main. If the variation in pressure within the bell is slight, a correspondingly short movement of the roller 46 will be required to bring the lever 36 back to normal position and stop the motor, whereas a radical change of pressure in the main and corresponding pressure within the bell will enable the bell to hold the motor circuit closed until the roller 46 has travelled a considerable distance from its normal neutral position and the period of motor operation for any given step in the adjustment will be correspondingly prolonged.

Inasmuch as the clutch member 55 is instantly released when the motor circuit is broken, it will be obvious that the above described timed intervals of motor operation and of dwell between successive steps of motor operation may be made brief enough to avoid danger of overrun in valve adjustment and still bring about the required degree of total adjustment necessary to reestablish normal pressure in the main.

Where valves of the so-called butterfly or oscillatory disc type are employed to control the delivery of gas or other elastic fluid into a main, a variable rate of valve movement is desirable to compensate for the variable degree of shut off due to the fact that the area of the opening decreases more rapidly as the valve approaches the closed position than it does during the initial movement of the valve from full open position.

Approximately the desired compensation may be obtained by so locating the arm 14 on the shaft 13 that when the valve is fully opened this arm will occupy a position substantially perpendicular to a line parallel with the axis of the main and by making this arm 14 longer than the valve actuating arm 16, the arm 16 being preferably at right angles to said line when the valve 11 is approximately at an angle of forty-five degrees to the axis of the main. In the illustrated arrangement, a seventeen degree movement of the arm 14 in a counterclockwise direction (Fig. 3) will swing the valve 11 from full open position to approximately a forty-five degree angle, whereas an additional twenty-eight degree movement of the arm 14 in the same direction will be required to close the valve and in the final portion of this movement the rate of valve movement will be relatively slow as compared with its movement from open position to the forty-five degree angle position. By shortening the arm 14 or changing its starting position to one in which said arm will more closely approach parallelism with a line parallel with the axis of the main when the valve is closed, the final closing movement may be additionally retarded and in any given installation it is possible to obtain a substantially uniform rate of shut off for any given period of motor operation regardless of the starting position of the valve for any given step in its adjustment.

Considerable variation in structure will obviously be possible in view of the disclosure herein contained. In Figure 6 I have diagrammatically illustrated a switch arm 63a in control of an auxiliary circuit having terminals 66a and 67a which control relay solenoidal switches 85 and 86 for closing the motor circuits through the field coils 23a and 24a of the motor. These and various changes in the mechanical structure disclosed in the drawings will be within the skill of the ordinary mechanic familiar with the requirements of the art to which this invention pertains.

It will also be understood that while I have illustrated a magnetic clutch having a driving member 57 and a driven member 55, this form of clutch is preferred for the reason that in association with an electric motor, it furnishes convenient and reliable means for instantly releasing the fulcrum bar from pressure derived through motor operation and thus allowing the bell to again function normally. Therefore the use of a magnetic clutch is not essential, since any reliable clutch releasing means responsive to the operation of a motor driven tilting mechanism or equivalent timing mechanism, may be employed.

Ordinary limit switches, preferably cam operated mercury switches, indicated at 68 and 69 may be employed to break the energized motor circuit as the valve reaches either its full open or closed position.

While I have illustrated and described my invention as applied to the inlet valve of a gas service main, its availability for other valve adjustments at either the inlet or outlet of a main or any chamber will be obvious. Therefore, in the appended claims, I include claims to my improved valve adjusting mechanism per se.

I claim:

1. The combination with a service main provided with a valve adapted to regulate deliveries of fluid to the main from a source of supply, of motor driven means for actuating said valve toward either full open or closed positions, a movable member responsive to pressure in the main at the delivery side of said valve, a normally inoperative lever responsive to movements of said movable member from normal position, connections associated with said lever for controlling the operation of the motor, means for utilizing valve adjusting movements to progressively apply pressure to said lever in opposition to that exerted by said movable member, and means for immediately relieving the said lever from such opposing pressure when the motor stops, whereby the movable member is again made fully responsive to pressure within the main.

2. The combination with a valve for regulating deliveries of fluid, of a reversible electric motor having connections for adjusting said valve toward either full open or closed positions, a normally inoperative circuit closer adapted to be moved in either direction to close one of the motor circuits, means responsive to pressure at the delivery side of said valve for progressively actuating the circuit closer under pressure variations above or below the predetermined normal pressure, motor operated means for progressively applying to said circuit closer a counterpressure tending to return it to normal position, and means for automatically releasing the circuit closer from such counterpressure when the motor circuit is broken.

3. The combination with a service main provided with a butterfly valve, of a valve actuating arm, a motor actuated shaft having an arm linked to the valve actuating arm, said arms having relative positions and proportionate lengths for progressively retarding the movement of the valve from full open to closing position for any given arc of step oscillation of the motor shaft, motor starting means controlled by pressure within the main, and automatic motor stopping means timed in its operation in proportion to the degree of variation from the predetermined normal pressure within the main.

4. A valve adjusting mechanism, comprising the combination with valve actuating motor driven devices, of an electric motor for operating said devices, an electromagnetic clutch in circuit with the motor and having one member connected to be actuated thereby continuously when the motor is in operation, pressure responsive mechanism for closing the motor circuit, connections, controlled by said clutch, for substantially simultaneously interrupting the motor circuit and allowing the pressure responsive mechanism to again operate normally, and connections associated with the electromagnetic clutch for stopping the motor.

5. In a system of the described class, the combination with a service main provided with an inlet valve, of electrically operated valve adjusting mechanism, an electromagnetic clutch in circuit with said electrically operated mechanism and having one clutch member progressively movable by said mechanism while the latter is in operation, a pressure responsive switch for closing a cirucit of the electrically operated mechanism, connections associated with said movable clutch member for applying progressively increasing counterpressure to the pressure responsive switch during operation of the valve adjusting mechanism for a circuit interrupting operation, said clutch being adapted to relieve the switch from counterpressure when said clutch is deenergized.

6. In a system of the described class, the combination with a service main provided with an inlet valve, a valve adjusting reversible rotary electric motor operatively connected to move the valve in either direction, an electromagnetic clutch in circuit with the motor, and mechanically connected for actuation thereby, motor starting means responsive to variations in pressure within the main, means associated with the magnetic clutch for applying counterpressure to the motor starting means for a motor stopping operation, and means for restoring the clutch to normal position and releasing the motor starting means from such counterpressure substantially simultaneously with a motor stopping operation.

7. In a valve adjusting mechanism, the combination with a valve adjusting motor, of an oscillatory shaft driven by said motor a clutch member fast on said shaft, an associated electromagnetic clutch member normally loose on the shaft, associated arms adapted to resiliently restore said clutch member to normal position when de-energized, a pressure responsive device for starting the motor and closing an energizing circuit through the electromagnetic clutch member, and mechanism operatively associated with said electromagnetic clutch member for progressively applying counter-pressure to the pressure responsive means to move the latter to an inoperative position, said mechanism being adapted to stop the motor and release the pressure responsive means for further normal operation.

8. In a system of the described class, the combination with a service main provided with an inlet valve, of a reversible electric motor provided with connections for progressively actuating said valve, a two-directional switch for closing the circuits of said motor, means responsive to variations in pressure within the main at the outlet side of said valve for selectively actuating said switch in either direction, an electromagnetic clutch in the motor circuit, rotatable while the motor is in operation and provided with connections for progressively applying counterpressure to said pressure responsive means, and automatic means, inoperative when either of said motor circuits are closed, for removing the counterpressure when such motor circuit is interrupted.

9. In a valve adjusting mechanism, the combination with a valve having a valve actuating arm, of an oscillatory shaft provided with an arm linked to the valve actuating arm, an electric motor provided with reduction gearing for oscillating said shaft in a timed valve adjusting movement, pressure responsive means for starting the motor, an electromagnetic clutch mounted on the oscillatory shaft and having connections for applying counter-pressure to said pressure responsive means for a timed motor stopping operation, and resilient means for automatically relieving the counter-pressure upon interruption of the motor circuit and restoring the clutch members to normal relation.

10. In a system of the described class, the combination with a service main provided with an inlet valve having a valve actuating arm, of an oscillatory shaft provided with an arm linked to the valve actuating arm, said arms being positioned for progressive variation in the rate of valve movement between full open and closed positions, an electric motor having connections for oscillating said shaft in a relatively slow movement as compared with the speed of the motor, means responsive to pressure in the main for starting the motor, an electromagetic clutch mounted on the oscillatory shaft and having connections for applying counterpressure to said pressure responsive means for a timed motor stopping operation, said electromagnetic clutch having resilient means for relieving the counterpressure upon interruption of the motor circuit, and limit switches for interrupting the motor circuit during final movements of the valve to full open and closed position.

11. In a valve adjusting mechanism, the combination with a valve for regulating fluid pressure and electrically operated valve actuating mechanism, of a switch controlling electric current supply to said mechanism, an oscillatory valve adjusting shaft included in said mechanism and provided with an electromagnetic clutch having fast and loose clutch members, resilient means for holding the loose clutch member in a predetermined normal position, a lever responsive to pressure at the controlled side of said valve for selectively closing a plurality of electrical circuits for actuating said mechanism in a plurality of directions, and means, associated with the magnetic clutch, for progressively applying counter-pressure to said lever for a circuit breaking operation, said clutch having a magnetic gap whereby it is adapted to release the lever from such counterpressure immediately when the circuit is broken, whereby the lever again becomes responsive to pressure at the controlled side of said valve.

12. In a system of the described class, the combination with motor actuated means for maintaining normal pressure within a main, of a motor starter responsive to variations in pressure within the main, motor operated means for applying counterpressure to the motor starter to interrupt the operation of the motor at timed intervals, and means for automatically relieving the motor starter of said counterpressure when the motor stops.

13. In a system of the described class, the combination with motor actuated means for maintaining normal pressure within a main, of a motor starter responsive to variations in pressure within the main, means associated with said motor for applying counter-pressure to the motor starter to interrupt the operation of the motor at intervals timed in proportion to the variation in pressure within the main, and means also associated with said motor for automatically and immediately relieving the motor starter of said counter-pressure when the motor circuit is interrupted.

FREDERICK W. ELLS.